United States Patent [19]
Johnstone et al.

[11] 4,025,062
[45] May 24, 1977

[54] THERMAL DEBURRING UNIT

[75] Inventors: Richard T. Johnstone, Lake Orion; Alfred C. Montag, Grosse Pointe Park; Charles H. Franklin; Clarence S. Vinton, both of Ann Arbor, all of Mich.

[73] Assignee: Surftran Company, Madison Heights, Mich.

[22] Filed: Mar. 8, 1976

[21] Appl. No.: 664,651

[52] U.S. Cl. .................................. 266/251; 51/319
[51] Int. Cl.² .......................................... B24C 1/00
[58] Field of Search ....... 72/56; 266/249, 251–253; 23/252 R; 241/DIG. 9; 51/59 SS, 319, DIG. 11

[56] References Cited
UNITED STATES PATENTS

| | | | |
|---|---|---|---|
| 3,547,589 | 12/1970 | Rice et al. | 23/252 R |
| 3,666,252 | 5/1972 | Rice | 266/249 |
| 3,851,426 | 12/1974 | Lemelson | 51/319 |

*Primary Examiner*—Gerald A. Dost
*Attorney, Agent, or Firm*—Harness, Dickey & Pierce

[57] ABSTRACT

Apparatus for the rapid removal of burrs from workpieces by the application of transient thermal energy in a closed chamber. The chamber comprises a downwardly open upper closure fixedly supported above a vertically movable lower closure, both closures being water-cooled. Means are provided for alternately moving work supporting platens into position above the retracted lower closure. After being raised by a yieldable motor, the lower closure is drawn into sealing contact with the upper closure by a plurality of screws mounted around the upper closure and supporting a clamping ring. Pressure tightness is achieved by an uncompensated seal which does not require excessive clamping forces. Combustible gases are metered to the chamber and at the same time to charging cylinders, the gases in the charged cylinders then being forced into the chamber to obtain the maximum gas charge. The mixture passes through a mixing block having poppet valves which open in a downstream direction and are thus aided in closing by the explosive force. A controlled amount of water is also injected into the mixing block to protect these valves. An exhaust valve is provided in the mixing block so that the spent gases do not flow past and cause damage to the chamber seal when the lower closure is opened.

22 Claims, 11 Drawing Figures

FIG. 1.

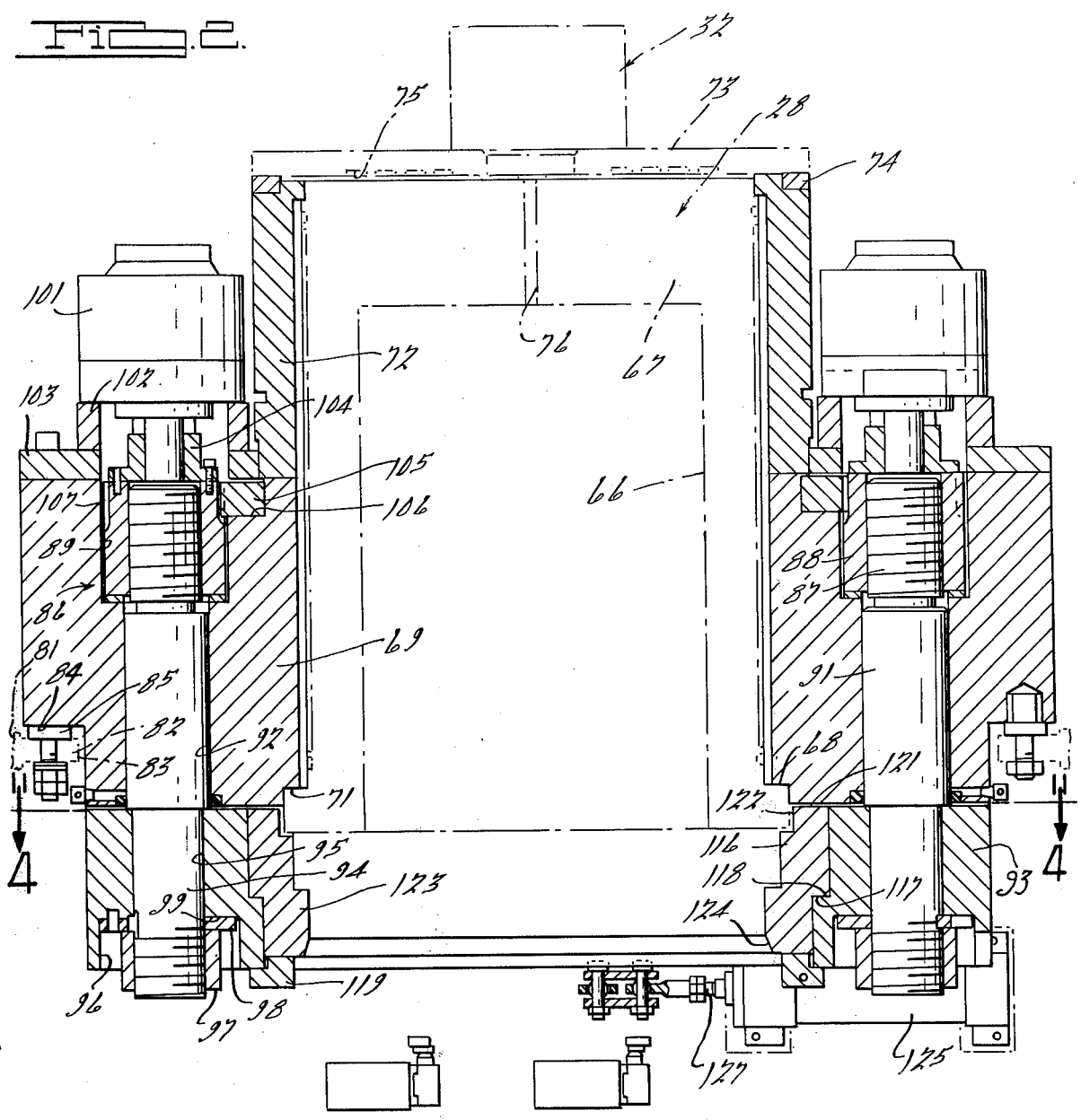

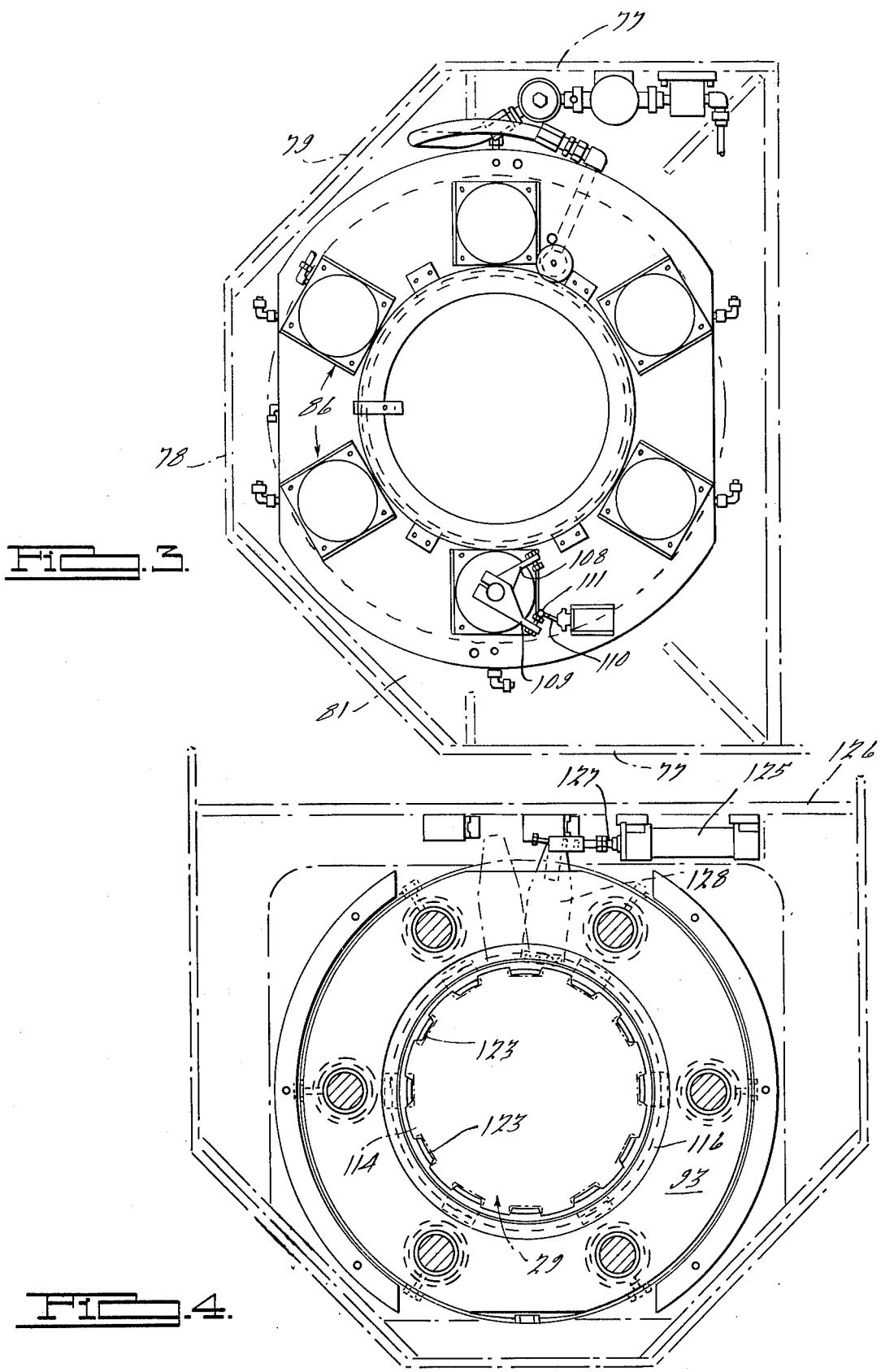

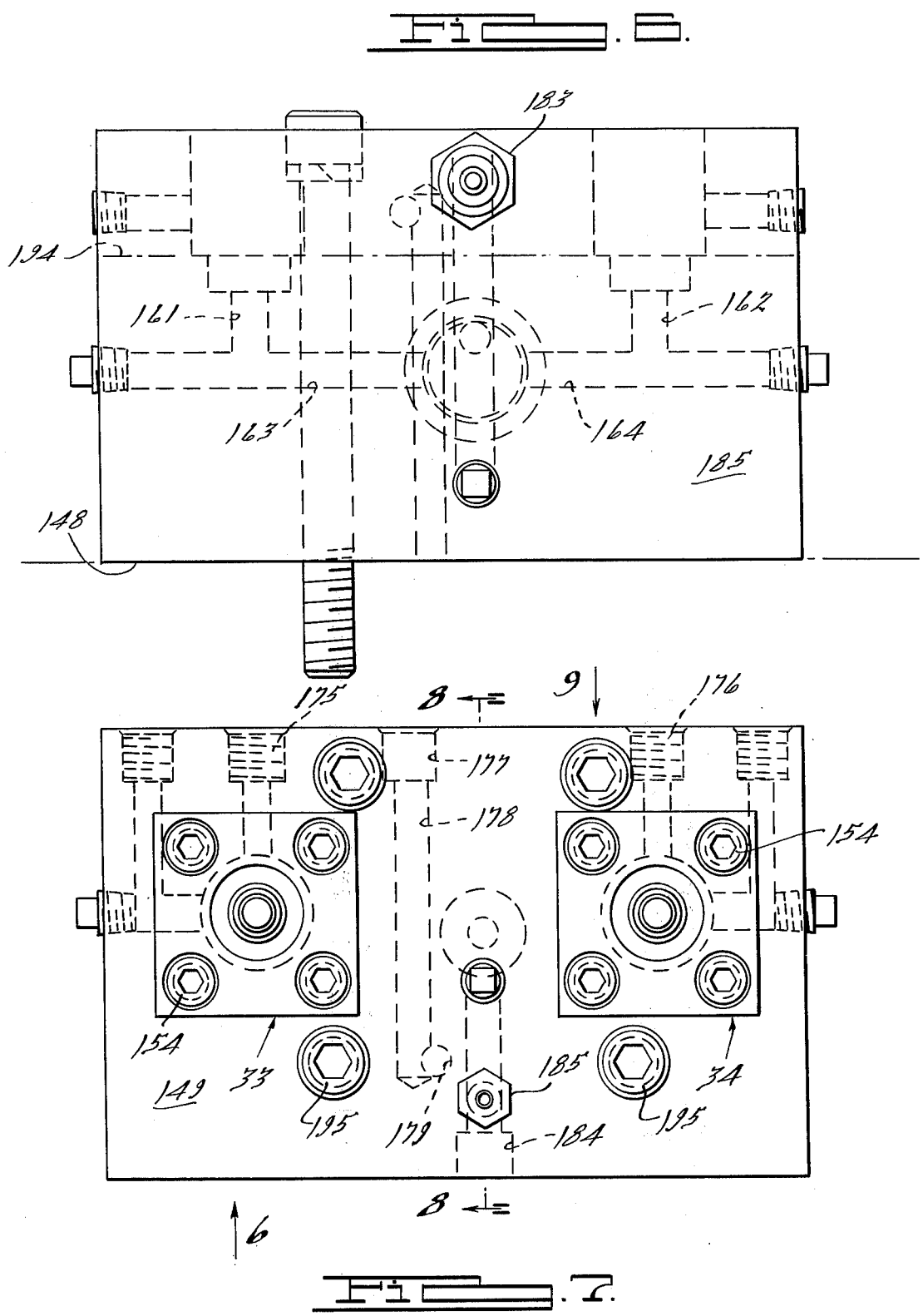

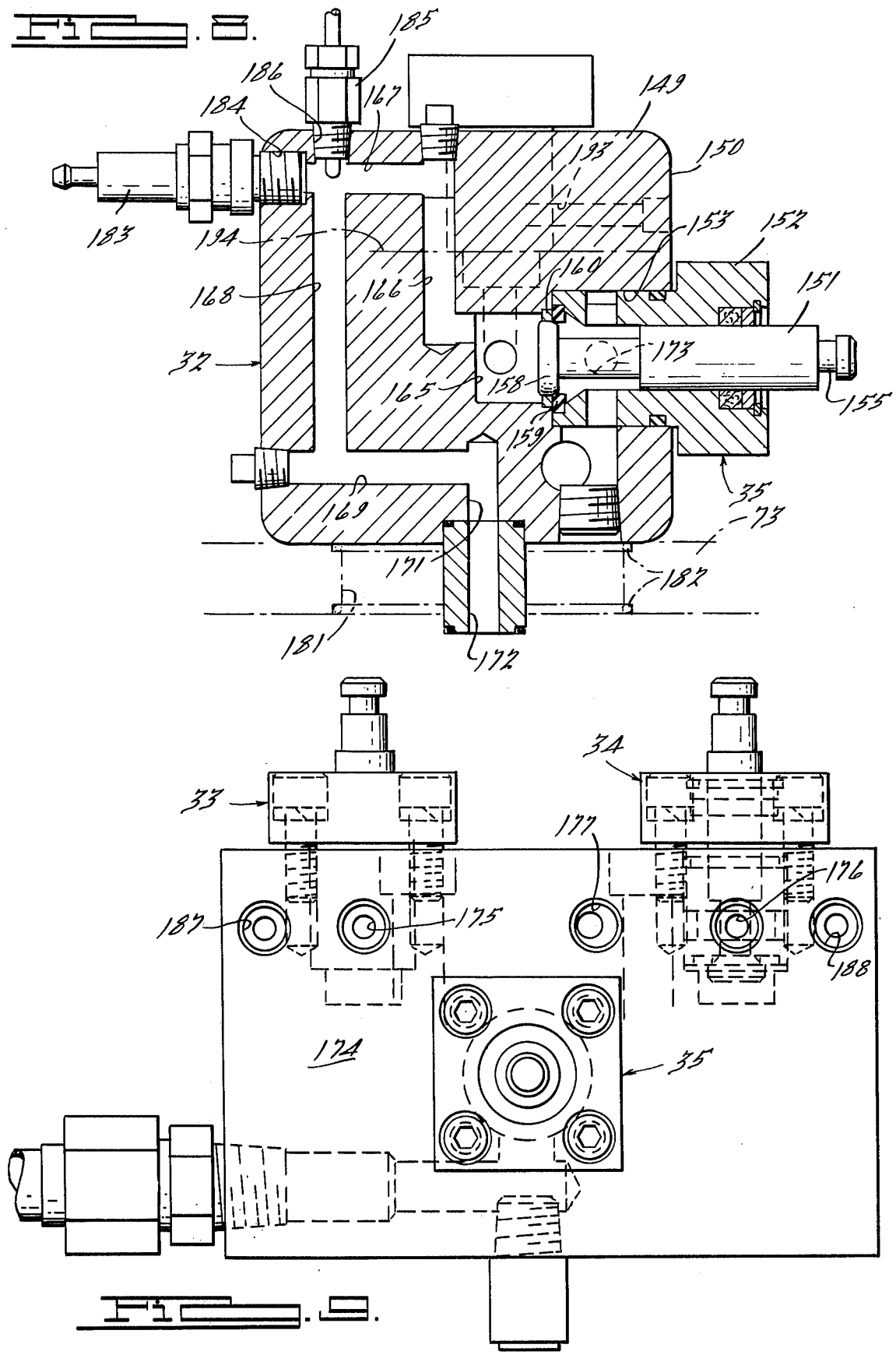

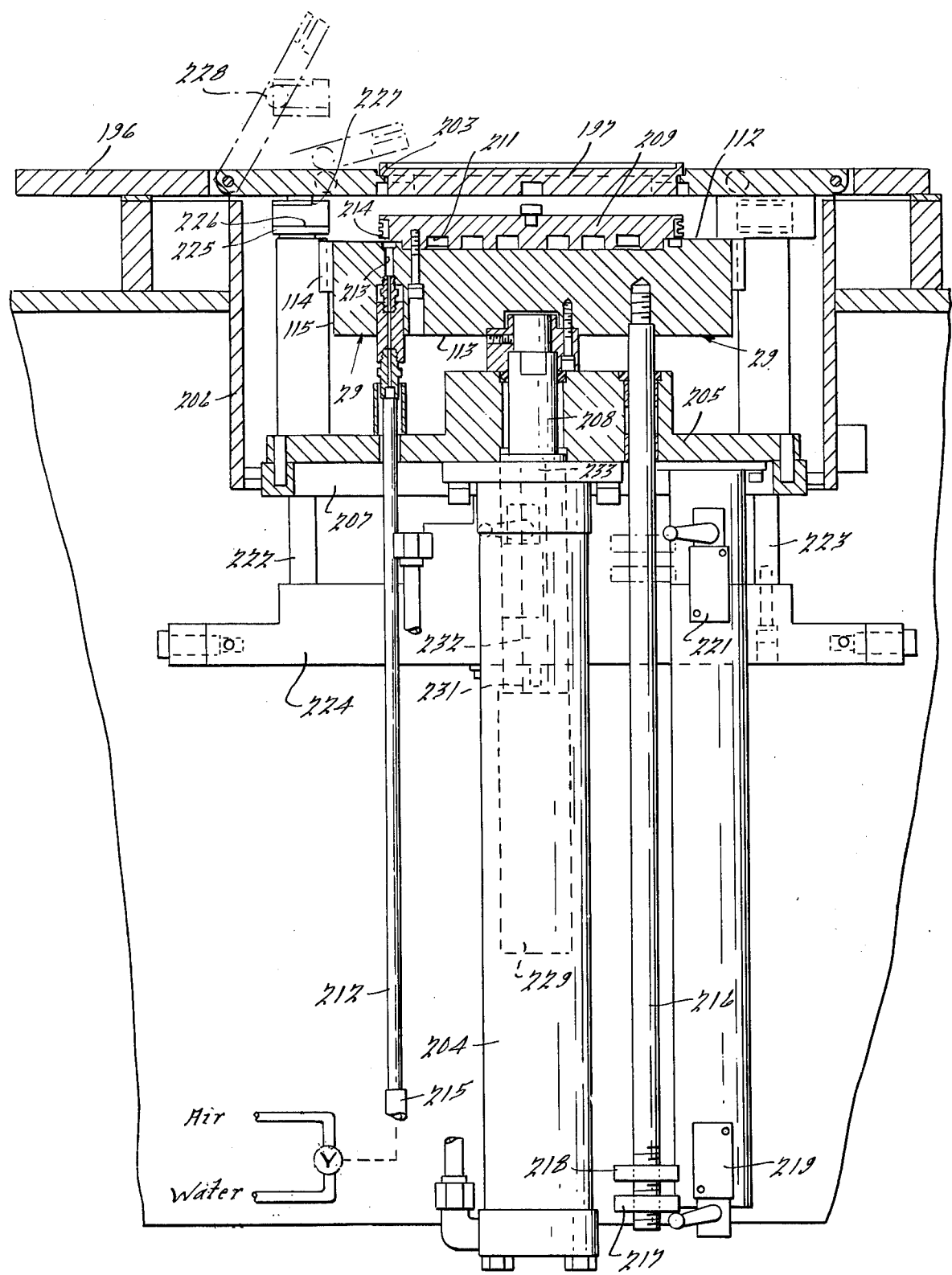

THERMAL DEBURRING UNIT

BACKGROUND OF THE INVENTION

1. Field of the Invention

The invention relates to apparatus for the rapid thermal energy removal of superfluous projections on articles such as metal and plastic workpieces. Apparatus of this type uses a closed chamber in which the articles are placed with voids around them, combustible gases being forced into the closed chamber and ignited to obtain a rapid release of thermal energy which removes the projections, such as burrs and the like.

2. Description of the Prior Art

Rice U.S. Pat. No. 3,666,252 shows an apparatus of this type in which the upper closure of the chamber is supported by a C-frame with a plurality of lower closures supported by a turntable. After articles are placed on each lower closure, it is lifted by a toggle mechanism into engagement with the upper closure, the toggle mechanism exerting a very high force in order to seal the closures together. This machine had a number of drawbacks which it is an object of the present invention to overcome. The high force exerted by the toggle mechanism required an equivalently strong C-frame which in turn limited, as a practical matter, the size of the chamber which could be employed. The type of parts which could be placed in the chamber was also limited, since the toggle mechanism stroke was not large. The high sealing forces were apt to distort the C-frame which could cause a curved motion of the lower closure onto the upper closure, possibly resulting in the galling of important surfaces. The large hydraulic pump and electric motor required to drive the toggle mechanism also causes excessive noise and heat. Furthermore, the tremendous forces involved could cause loss of lubrication in the toggle mechanism, resulting in the tendency to remain at times in a locked position.

Machines built along the lines of the disclosure in the above-mentioned patent had other drawbacks which the present invention overcomes. The seal between the lower and upper closures was previously a gasket seal which required high pre-loading, with the resultant chamber size limitations and clamping force problems mentioned above. Cooling of the lower closures on the turntable was quite difficult to achieve. The mixing valves were of a tapered or needle type held in closed position by hydraulic cylinders and so arranged that the explosion in the chamber tended to open them, thus requiring high closing forces. The valves were also exposed to high transient heat which took place in the chamber. After ignition of the mixture, the exhaust gases were released by lowering the lower closure, a procedure which would be destructive if uncompensated seals were used. It was difficult to place high pressure charges of combustible gases in the chamber because of the large charging cylinder volumes which would be required. The gas charging cylinders in the previous apparatus were horizontally mounted, thus allowing the lubricant to occasionally run into the oxygen line and cause pre-ignitions.

Rice et al. U.S. Pat. No. 3,547,589 discloses a shuttle type pressure vessel structure for processing stock, requiring at least a pair of pressure vessel elements shuttled between stations. The present invention incorporates a different means for alternately moving workpieces into position to be processed, is constructed on different principles and has the important advantage over the patented structure of avoiding the cumbersomeness of moving an entire pressure vessel structure into and out of the working position.

BRIEF SUMMARY OF THE INVENTION

It is an object of the present invention to overcome some of the shortcomings of the prior art apparatus and to provide a novel and improved thermal deburring unit which can be designed for a wide variety of diameters and heights of thermal chamber using the same basic arrangement, thus permitting the unit to accommodate workpieces of different sizes and numbers.

It is another object to provide an improved thermal deburring unit of this type in which no stress is transmitted from the thermal chamber to the supporting frame during the period of rapid thermal energy release, but instead these forces are confined to the upper and lower closures themselves and the means for clamping them, thus avoiding any possible frame distortions and greatly reducing the cost of fabrication.

It is a further object to provide an improved thermal deburring unit which utilizes a sealing arrangement as part of the novel combination, the result of which is a reduction in the necessary clamping forces, a less cumbersome mechanism and a minimum of unwanted distortions or deflections of this mechanism.

It is another object to provide an improved deburring mechanism of this nature which incorporates a novel lifting arrangement for the lower closure, enabling relatively high workpieces to be accommodated.

It is also an object to provide an improved thermal deburring unit having a single rather than a plurality of lower closures, thus facilitating cooling of the lower closure while still permitting a high rate of article feed to the lower closure for lifting into deburring position.

It is a further object to provide a novel deburring unit of this type in which the control valves are aided in their sealing effect by the explosions, thus improving valve life, permitting larger porting, and greatly reducing the required valve operating forces.

It is another object to provide an improved thermal deburring unit in which a controlled amount of water is used to immerse and therefore protect the valves against transient heat damage.

It is also an object to provide a deburring unit of this character in which engagement of the lower closure to the clamping mechanism is accomplished in a simple manner, and the lifting mechanism for the lower closure is such as to prevent damage to the mechanism should a workpiece or foreign object obstruct the closure.

Briefly, the thermal deburring unit of this invention comprises a thermal chamber having a downwardly open upper closure, a vertically movable lower closure, means moving said lower closure between a lower position in which articles may be placed thereabove, and an upper position in which said articles are within the upper closure, pressure-tight seal means between said closures when the lower closure is in its upper position, circumferentially arranged upwardly and downwardly facing surfaces on said upper and lower closures respectively, clamping means having a first portion engageable with the surface of said upper closure and a second portion engageable with the surface of said lower closure, tightening means movable between a sealing position in which said two clamping means portions are drawn together after said upper closure has been moved to its upper position, and a non-sealing position, means supplying pressurized combustible gases into said chamber after said tightening means has been moved to its sealing position, and means for igniting said pressurized gases.

The lower closure moving means comprises a reciprocable hydraulic motor, and means supplying hydraulic fluid to said motor at a predetermined and relatively low pressure, whereby an obstruction between said closures which prevents movement of the lower closure to its upper position will not cause damage to the closure surfaces. The pressure-tight seal means comprises an annular groove in one of said closures and an uncompensated seal within said groove responsive to radially outward pressure to increase its sealing action. The first portion of said clamping means comprises a member surrounding said upper closure and engageable with its upwardly facing surface. The second portion comprises an engagement ring rotatably supported by said last-mentioned member and having circumferentially arranged inwardly extending teeth, the circumferentially arranged surface on said lower closure comprising teeth passable between said ring teeth as the lower closure is moved to its upper position. Means are provided for rotating said ring after the lower closure has reached its upper position from a releasing position to an engaging position in which the ring teeth are in registry with the lower closure teeth. The tightening means comprises a plurality of circumferentially arranged screw-and-nut assemblies connecting said clamping means portions, and motor means for simultaneously driving said assemblies.

In another aspect, the thermal deburring unit comprises an openable and closeable thermal chamber, means for placing articles in and removing them from said chamber, means for sealing the chamber pressure tight with an article therein, means for charging the sealed chamber with at least two gases forming a pressurized combustible mixture, means for valving, mixing and igniting the gases (a mixing block) disposed between said charging means and said chamber, separate gas conduits leading from said charging means to said mixing block, a mixing chamber in said mixing block, a mixed gas conduit leading from said mixing chamber to said thermal chamber, valves interposed between said mixing chamber and the separate gas conduits leading from said charging means, said valves being poppet valves movable toward said mixing chamber to an open position and away from said mixing chamber to a closed position, whereby a pressure increase in said mixing chamber due to ignition of said gases in the thermal chamber will tend to further close said valves, and valve actuating means moving said valves to their open and closed positions.

The mixing block has an exhaust vent, an exhaust valve is disposed between said mixed gases conduit and said exhaust vent, said exhaust valve being a poppet valve movable toward said mixed gases conduit to an open position and away from said mixed gases conduit to a closed position, whereby pressure in said mixed gases conduit will tend to further close said exhaust valve, and actuating means is provided for moving said exhaust valve to its open and closed positions. The mixing block is further provided with a source of water, and means for injecting a predetermined amount of water into the passages entering and connecting said mixing chamber and valves, said passages being so positioned that the water injected therein will rise to a level above and immmerse the valves, so that the valves will be protected from thermal damage upon ignition of the gases in said thermal chamber.

In still another aspect, the thermal deburring unit comprises a thermal chamber, means for opening said chamber, placing an article to be deburred therein, and closing said chamber in a pressure-tight manner, a source of combustible gas, a charging cylinder, first gas conduit means leading from said gas source to one end of said charging cylinder, a flow regulator in said first conduit means, a check valve between said flow regulator and said one end of the cylinder, a piston in said charging cylinder, a reciprocable motor for moving said piston toward and away from said one end of the charging cylinder, second gas conduit means leading from said one end of the charging cylinder to said thermal chamber, whereby gas from said source may be initially supplied both to said thermal chamber and said charging cylinder and thereafter forced from said charging cylinder into said thermal chamber, and means for igniting the combustible gases prior to opening the chamber and removing the article.

In yet another aspect, the thermal deburring unit comprises a sealable thermal chamber having a fixed downwardly open upper closure, a vertically movable lower closure, a reciprocable motor beneath said lower closure, means fixedly mounting said lower closure on said motor, the lower closure being movable by said motor between an upper position against said upper closure and a lower position, a table movable in a plane above the lower position of said lower closure and having a plurality of openings larger than said lower closure, a plurality of spaced pairs of leaves hinged to said table, each pair of leaves being mounted in one of said openings and hinged so as to swing between a lower position in the plane of said table so as to partially close its opening and an upper position swung away from said opening, a work bearing platen resting on each pair of leaves when in their lower position, said platens being substantially smaller than said lower closure, the table being movable so that platens are successively placed above said lower closure when in its lower position, whereby said lower closure will lift said platen when the lower closure is moved toward its upper position, and means responsive to upward movement of said lower closure from its lower position for swinging said leaves to their upper positions, whereby said lower closure may pass through said opening, means for filling the closed and sealed chamber with combustible gases and means for igniting the combustible gases.

BRIEF DESCRIPTION OF THE DRAWINGS

FIG. 2 is a cross-sectional view of the thermal chamber and its surrounding block, showing the tightening means;

FIG. 3 is a top plan view of the thermal chamber block and tightening means showing the manner in which they are supported by the frame;

FIG. 4 is a plan cross-sectional view taken along the line 4—4 of FIG. 2 and showing the clamping teeth on the engagement ring;

FIG. 5 is an enlarged fragmentary cross-sectional view in elevation of the lower portion of the upper closure showing the sealing means between the upper and lower closures;

FIG. 6 is a side elevational view of the mixing block taken in the direction of the arrow 6 of FIG. 7;

FIG. 7 is a top plan view of the mixing block;

FIG. 8 is a cross-sectional view in elevation of the mixing block taken along the line 8—8 of FIG. 7;

FIG. 9 is a side elevational view of the mixing block taken in the direction of the arrow 9 of FIG. 7;

FIG. 11 is a cross-sectional view taken along the line 11—11 of FIG. 10 and showing the closure lift mechanism as well as the means for swinging the table leaves.

DESCRIPTION OF THE PREFERRED EMBODIMENT

General Arrangement

Figure 1:
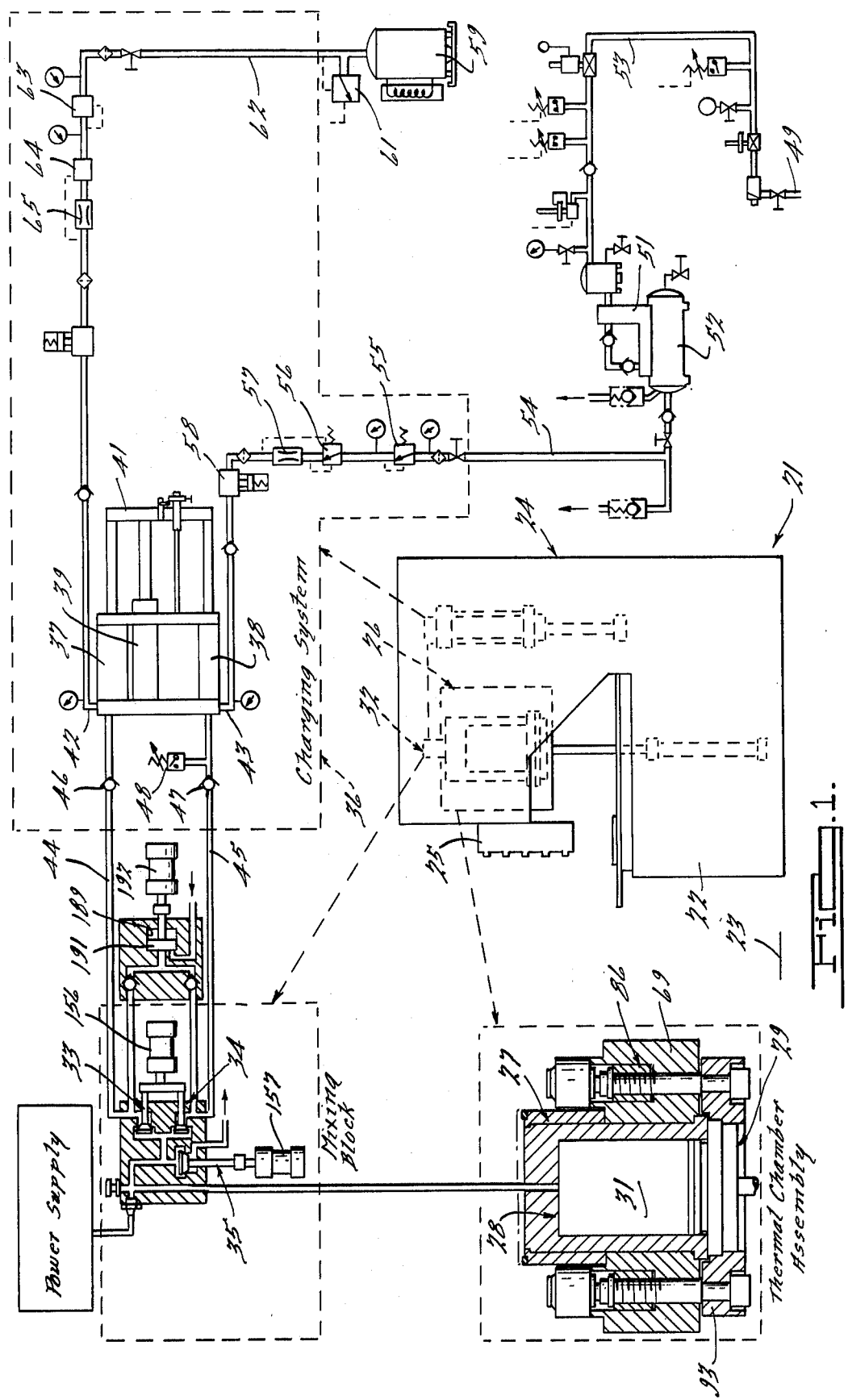
FIG. 1 is a diagram showing the entire thermal deburring unit in schematic fashion with the thermal chamber assembly, mixing block, charging system, and gas sources being shown in further detail.

The thermal deburring unit is generally indicated at 21 in FIG. 1 and comprises a rectangular base 22 in front of which is an operator's station indicated at 23. A supporting frame generally indicated at 24 extends upwardly from the rear portion of base 22 and then forwardly over the base. A control console 25 is mounted on the forward end of the supporting frame facing the operator.

A thermal chamber assembly generally indicated at 26 is mounted within the portion of frame 24 which is disposed over base 22. This assembly has a thermal chamber generally indicated at 27 having an upper closure generally indicated at 28 and a lower closure generally indicated at 29.

The space 31 within chamber 27 receives a mixture of combustible gases fed from a mixing block generally indicated at 32. This mixing block surmounts upper closure 28 and has two inlet valves generally indicated at 33 and 34 for the admission respectively, for example, of oxygen and natural gas. The mixing block also comprises a vent valve generally indicated at 35 which controls the exhaust of burned gases from space 31.

Charging System

The combustible gases are supplied to mixing block 32 by a charging system generally indicated at 36. The charging system comprises an oxygen cylinder 37 and a natural gas cylinder 38 both of which have pistons reciprocable by a hydraulic cylinder motor 39. This motor is secured to a bar 41 attached to the piston rods and moves the pistons between a retracted position as shown in FIG. 1 and an advanced position. In the retracted position, oxygen and natural gas may be supplied to ports 42 and 43 respectively at the cylinder ends, thus filling the cylinders. At the same time, according to the invention, the gases will flow to conduits 44 and 45 respectively (past check valves 46 and 47), through mixing block 32 to thermal chamber 27. Thus, the thermal chamber will be prefilled with gases at the same pressure as cylinders 37 and 38. Thereafter, the pistons of cylinders 37 and 38 will be moved to their charging position, forcing the gases from these cylinders into the thermal chamber. In this manner, it is possible to substantially increase the total amount of gases in the chamber available for combustion. This reduces the size requirements for the charge cylinders, especially where high pressure gas charges are needed.

A variable pressure switch 48 is also provided for the natural gas conduit 45.

Means are provided for metering the oxygen and natural gas delivered directly to the thermal chamber as well as to the charging cylinders. The natural gas supply conduit 49 is connected to a compressor 51 and storage chamber 52 by a conduit 53 having a conventional arrangement of regulators, gauges, shut-off and check valves, vents, and low and high pressure switches which need not be described in detail. Natural gas is delivered from storage tank 52 to a conduit 54 at a pressure, for example, of 150 psi. A pressure regulator 55 may reduce the pressure to perhaps 120 psi, and the gas then passes through a differential pressure regulator 56 which monitors an orifice 57 to maintain a constant pressure differential and therefore constant flow. The gas may also flow through an automatic fail-safe valve 58 before reaching port 43.

The oxygen may be supplied from a liquid oxygen evaporator 59 past a safety release valve 61 through inlet conduit 62 and thence to a pressure regulator 63, differential pressure regulator 64 and orifice 65 similar to those in the natural gas line. Thus, a constant flow of gaseous oxygen will be maintained to port 42.

Thermal Chamber Assembly

The construction of thermal chamber 27 and its adjacent parts are best seen in FIGS. 2, 3 and 4. Upper closure 28 comprises a downwardly open member having an annular side wall 66 and a closed top 67. A shoulder 68 extends outwardly from the lower end of wall 66. An annular block 69 surrounds the lower portion of wall 66 and has a lower shoulder 71 resting on shoulder 68. A sleeve 72 surmounts block 69 and extends to the top of closure 28. A retaining ring shown in dot-dash lines at 73 is bolted to the top of closure 28 and overlaps sleeve 72 so that the upper closure is suspended within block 69. A spacer ring 74 is disposed between the sleeve and retaining ring, and water passages 75 are formed beneath the retaining ring for cooling purposes. Mixing block 32 rests on retaining ring 73, and a gas inlet passage 76 is formed in closure top 67 leading downwardly from the mixing block.

Frame 24 is provided with side plates 77 and a front plate 78, the side and front plates being connected by angled plates 79. A horizontal supporting plate 81 is disposed within the confines of these outer plates and has an inner shoulder 82 surrounding an opening 83. A shoulder 84 is formed at an intermediate portion of block 69 and is supported by shoulder 82 through resilient mounts 85.

Closure Tightening Means

Block 69 carries the means for tightening lower closure 29 against upper closure 28. This means comprises a plurality of circumferentially spaced screw and nut assemblies generally indicated at 86 carried by the block. Each screw and nut assembly comprises a screw 87 and a nut 88 threadably mounted thereon, these being disposed within a recess 89 in the block. Means (not shown) for supplying pressurized lubricant to space 89 is preferably provided. An unthreaded portion 91 of screw 87 extends downwardly through a bore 92 in the block to the bottom thereof. An annular clamp frame 93 is disposed below and slightly spaced from block 69. An unthreaded portion 94 of each screw 87, narrower than portion 91, extends downwardly through a bore 95 in clamp frame 93, and through an enlarged recess 96 in the bottom of the clamp frame. A shoulder such as a hex nut 97 is fixed to the bottom of screw 87 and a leveling washer 98 is disposed between this shoulder and the upper surface 99 of the recess. Thus, upward movement of screws 87 will force clamp frame 93 upwardly.

A rotary motor 101 is provided for rotating each nut 88 so as to move screw 87 upwardly or downwardly. The motor is mounted on a base 102 secured to a plate 103 surmounting block 69. Nut 88 is connected to the motor by a keyed coupling 104. While each nut is individually driven, they are synchronized by a ring gear 105 supported in a recess 106 of block 69 and meshing with teeth 107 on the outside to the nuts.

Six screw and nut assemblies 86 are shown in FIG. 3 surrounding the thermal chamber, although a lesser or greater number of assemblies could be used, depending upon the diameter of the thermal chamber. Since the tightening forces exerted by the screw and nut assemblies are applied directly to the upper and lower closures (the means for the lower closure to be presently described), the structural members which consititute frame 24 need not be designed to absorb these sealing forces; they merely support the weight of the parts. Limit arms 108 and 109 are secured to the shaft of one motor 101 and actuate two limit switches 110 and 111, to signal the arrival of the motor at its sealing and releasing positions. Typically, a motor rotation of about 100° is sufficient to move clamp frame 93 between its positions.

Lower Closure and Engagement Ring

The construction of lower closure 29 is seen best in FIGS. 2, 4, 5, 10 and 11. The lower closure is of flat circular shape, with an upper sealing surface 112 in a lower surface 113. A plurality of teeth 114 are spaced around the periphery of the upper portion of lower closure 29. The lower portion 115 (FIG. 11) below teeth 114 is recessed to approximately the depth of the splines. Further details of lower closure 29 are shown in FIG. 11, but those so far described will enable an understanding of the clamping and tightening means.

An engagement ring 116 is disposed within clamp frame 93, being rotatably mounted by means of a shoulder 117 which rests on a shoulder 118 of the clamp frame. A plurality of brackets 119 secured to the bottom of engagement ring 116 overlap the underside of the clamp frame to hold the engagement ring in place. The upper surface 121 of the engagement ring is relatively narrow, and a clearance recess 122 is provided on the upper portion of the ring for shoulder 68 of upper closure 28. A plurality of circumferentially spaced inwardly extending teeth 123 are formed on the lower portion of engagement ring 116. These teeth are of the same circumferential size as teeth 114 of lower closure 29, and the spaces between teeth 123 are sufficient to allow teeth 114 to pass upwardly or downwardly therethrough. Thus, the lower closure may be lifted upwardly until teeth 114 are above teeth 123, and ring 116 then rotated until the teeth are in registry. Thereafter, lower closure 29 may be forced into sealing engagement with the upper closure by the tightening means. The lower inner portion of the engagement ring is chamfered at 124 to facilitate entrance of the lower closure.

The means for rotating engagement ring 116 between its engaging and releasing positions comprises a reciprocable motor 125 carried by a frame member 126 and having a piston rod 127 connected to an arm 128 secured to the engagement ring. The motor can move arm 128 between its two positions as indicated in FIG. 4.

Closure Seal

FIG. 5 illustrates the sealing means between the lower and upper closures. The undersurface 129 of upper closure 28 is provided with a groove 131 within which is disposed an uncompensated seal 132, this being illustrated in the form of a conventional seal with an X-cross section. This seal acts analogously to four O-rings and is initially compressed when the lower closure is tightened, pressure from the thermal chamber during combustion of the gases reinforcing the sealing action. A conventional back-up ring 133, for example of nylon, is placed in groove 131 outwardly of seal 132 and protrudes slightly below the groove. At the time of the explosion, this back-up ring will prevent the possibility of damage due to seal 132 being forced into the space between the upper and lower closures.

Also partially disclosed in FIG. 5 are grooves 134 on the outside of upper closure 28 for carrying cooling water descending from retaining plate grooves 75. This cooling water will be conducted away from upper closure 28 by conduits 135, 136 and 137. From conduit 137 the cooling water is led by flexible hoses (not shown) to cooling passages in lower closure 29.

Seal Integrity Checking Means

Means are provided for checking the integrity of seal 132 both before and after the full charge of combustible gases is forced into thermal chamber 27. This is also illustrated in FIG. 5 and comprises an O-ring 138 in a groove 139 in the bottom of upper closure 28 outwardly of groove 131. A recess 141 is formed in the bottom of upper closure 28 between grooves 131 and 139. A conduit 142 leads to this recess from the side of the upper closure, and this conduit is fed from a source 143 of supply air, for example, at 20 psi. A solenoid control valve 144 is placed between source 143 and a conduit 145 leading to conduit 142, and a pressure sensitive switch 146 is disposed between valve 144 and conduit 145.

In operation of the seal integrity checking system, after lower closure 29 has been tightened against upper closure 28, valve 144 will be opened to supply pressurized air to groove 141. This will pressurize the space between seals 132 and 138. If the seals, and particularly seal 132 which would withstand the main explosive pressures, are intact, pressure sensitive switch 146 will sense the maintenance of the checking pressure and thereupon signal valve 144, through a control means indicated schematically at 147, to cut off air flow to recess 141. At the same time control means 147 could signal the charging mechanism 136 and mixing block 32 that filling of thermal chamber 27 with combustible gases may commence. If, on the other hand, the pressure in the space between the seals 132 and 138 drops below that supplied by source 143, the remaining steps in the operation will not start.

Pressure sensitive switch 146 may also be utilized to sense leakage of seal 132 when thermal chamber 27 is charged with pressurized combustible gases. For example, a second setting of this switch could be provided. A typical pressure range of combustible gases charged into the thermal chamber before ignition is between 40 and 300 psi. If the pressure in groove 141 rises above the second set point, say 30 psi, control means 147 would respond by aborting remaining portions of the cycle so that ignition would not occur.

Mixing Block

The construction of mixing block 32 is best seen in FIGS. 6–9. The rectangular block has a flat lower surface 148 resting on retaining ring 73. Oxygen inlet valve 33 and natural gas inlet valve 34 are mounted on the top 149 of block 32, and vent valve 35 is mounted on one side 150 of the block. All three valves are similarly constructed and may be described in detail with respect to valve 35 which is seen in FIG. 8. Each valve comprises a valve stem 151 slidably mounted in a bushing 152. The bushing is received by a recess 153 and has an enlarged portion outwardly of the block which is secured to the block by bolts 154. The outer end of stem 151 has a groove 155 for connection with its actuating means. In the case of valves 33 and 34, this comprises a reciprocable motor 156 which moves the valves simultaneously between their open and closed positions. Valve 35 is actuated by a similar motor 157. A valve member 158 is formed at the reduced inner end of each valve stem 151. A valve seat 159 is secured between the inner end of bushing 152 and the interior of the block and is engageable by valve member 158. In the case of exhaust valve 35, conventional stainless steel or other hardened ring 160 is mounted between seat 159 and the passage from which gases flow when the valve is open, for the purpose of preventing abrasion of the valve seat by particles entrained in the flowing gases.

When valves 33 and 34 are open, gases will flow downwardly through conduits 161 and 162 respectively (FIG. 6) to cross passages 163 and 164, meeting in a chamber 165 (FIG. 8) where they will be mixed. From there the mixed gases will flow upwardly through a conduit 166, horizontally through a conduit 167, downwardly through a conduit 168 and horizontally through a conduit 169 to a descending passage 171 which leads to a bored insert 172. This insert leads to space 31 within thermal chamber 27.

Chamber 165 is adjacent exhaust valve 35 so that when the exhaust valve is depressed, after the explosion has taken place in thermal chamber 27, the spent gases will be emitted through the vent valve to an exhaust port 173.

Side 174 of the mixing block (FIG. 9) has an oxygen inlet port 175 and a natural gas or other fuel inlet port 176. These ports lead to the spaces above the valve seats of their respective valves 33 and 34. A cooling water port 177 is also provided in side 174, leading through conduits 178 and 179 paralleling gas conduits 168 and 169 respectively. The cooling water flows from conduit 179 to a water cavity 181 and then flows to grooves 75 in the retaining plate. O-rings 182 are provided for sealing the ends of chamber 181.

A spark plug 183 connected to a high voltage power supply (see FIG. 1) is threadably mounted in a port 184 on the side 185 of block 32 opposite side 174. The spark plug is connected with the upper end of conduit 168 and is used to ignite the combustible gas mixture in thermal chamber 27. An ignition detector 185 in the form of a thermocouple is threadably mounted in a port 186 in the top of block 32 adjacent spark plug 183. The thermocouple will detect ignition due to the rapid temperature rise which will occur upon the explosion of the gases. Sensor 185 will also detect any improper or premature ignition such as might occur from hot spots or the like.

Means are provided for protecting the valve members 158 from the effects of rapid temperature rises when the explosion occurs. This means includes a pair of ports 187 and 188 (FIG. 9) on side 174 of the block which are adpated to receive a measured amount of injected water. The water is previously stored in a chamber 189 (FIG. 1) separate from the mixing block and is injected by a piston 191 driven by a hydraulic cylinder 192. The points of injection are the chambers above poppet valve members 158 of the oxygen and natural gas valves 33 and 34 respectively, through conduits indicated partially at 193 in FIG. 8. The water will be injected while valves 33 and 34 are open to receive the gases being charged into the thermal chamber, and the water will descend through conduits 161 and 162 to conduits 163 and 164, filling the chamber 165. The water will reach an approximate level indicated by the dot-dash lines 194 in FIGS. 6 and 8. Thus, water will immerse valve members 158 of all three valves 33, 34 and 35 when they are in their closed positions. However, since the level of passages 193 as well as water level 194 is below the level of upper gas conduit 167, water will not enter conduits 168, 169 or 171. This will leave open the conduits necessary for ignition and detection of ignition by spark plug 183 and detector 185 respectively. The injected water will serve to protect the valve members against the high heat transient which occurs upon ignition, thus preserving their life. After ignition, when vent valve 35 opens, the burned gases will be vented along with the measured amount of water.

A plurality of bolts 195 is provided in mixing block 32, these bolts passing through mixing block and securing it to the top of retaining plate 73.

When it is desired to remove and replace or repair one of the three valves, 33, 34 or 35, it is merely necessary to unscrew the four bolts 154 which hold the valve in place, and withdraw the bushing 152 along with the valve stem. It is therefore not necessary to disassemble the entire mixing block.

Lower Closure Lifting Mechanism and Work Supporting Means

Figure 10:
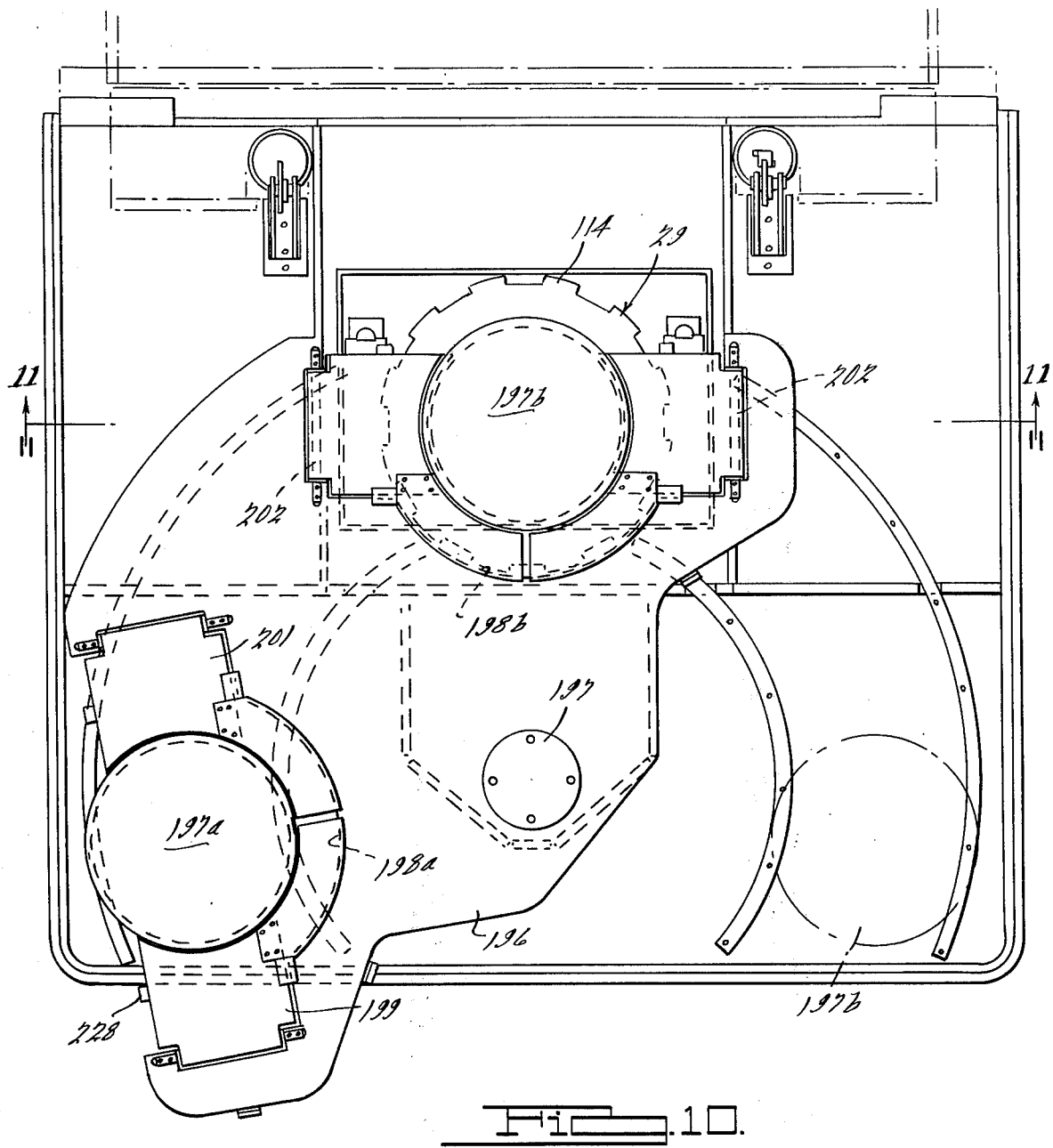
FIG. 10 is a plan view showing the swinging table for supporting the platens and alternately moving them over the lower closure.

FIGS. 10 and 11 show the construction of lower closure 29 and its lifting mechanism as well as means for alternately placing a plurality of lightweight work-carrying platens over the lower closure in position to be lifted into the upper closure. A movable table 196 is pivotally mounted at 197 within base 22 above the level of lower closure 29. The table is shown as being of arcuate shape and is adapted to carry two platens indicated at 197a and 197b in FIG. 10. Each platen is of circular shape, having a substantially smaller diameter than the lower closure. The table is provided with arcuate recesses 198a and 198b to permit the lifting of lower closure 29. In order to support platens 197a and 197b in position to be engaged by the lower closure as it is lifted, each recess has a pair of leaves 199 and 201. The outer portions of the leaves are hinged at 202 to table 196 and the inner edges are arcuately formed and have lips 203 which support plate 197 when the leaves are flush with the table. The leaves are swingable by means described below to upper positions as the platen is lifted by the lower closure so as to permit the lower closure to pass through opening 198a or 198b.

A reciprocable hydraulic motor 204 is provided below lower closure 29. This motor is carried by a mounting plate 205 mounted in the lower portion of a basin 206 secured to frame 22, the basin comprising four side plates and a reinforced bottom 207. The upper end of piston rod 208 of motor 204 is secured to the underside of lower closure 29. An insert 209 is mounted on the top of lower closure 29 and forms part thereof. The underside of this insert has cooling water conducting grooves 211. A vertically disposed conduit 212 has an upper end connected to a conduit 213 in the lower closure so that conduit 212 ascends and descends with the lower closure. Conduit 213 leads to a peripheral slot 214 between the underside of insert 209 and sealing surface 112 of lower closure 29. Means including a flexible hose 215 is provided for alternately using water and air to clean this upper sealing surface 112 before the lower closure is lifted. After the closures are sealed together, a measured quantity of water is injected through conduit 213 and slot 214 to the lower portion of chamber 31, filling the void between seal 132 and the chamber, and thereby protecting the seal from burning gases.

A limit switch actuating rod 216 is also carried by lower closure 29 and extends therebelow, this rod carrying a pair of actuating cams 217 and 218 controlling switches 219 and 221 respectively. The switches will indicate the arrival of lower closure 29 in its lower and upper positions.

The means for lifting and lowering leaves 199 and 201 for each platen 197 comprises a pair of vertically movable rods 222 and 223. The lower ends of these rods are secured to a crossbar 224. The upper rod ends carry cams 225 with horizontal open-sided slots 226, the tops of these slots being partially cut away at 227. Each leaf 199 and 201 carries a side mounted roller 228, and this roller is engageable by a cam 225 as it is lifted. In particular, roller 228 will clear the upper portion of this slot due to the recess 227 and will then be engaged by the bottom of slot 226. The relative movement of the cam and roller is seen in the three views of FIG. 11, the leaves in their final upper position being swung back sufficiently to permit lower closure 29 to be lifted to the upper closure.

An air operated cylinder 229 is provided for lifting crossbar 224. This cylinder is suspended below the bottom 207 of basin 206 and has a piston rod 231 at its upper end. The piston rod engages the bottom of crossbar 224 and a limited amount of air pressure is fed to the bottom of the cylinder. A long screw 232 has a lower end which secures crossbar 224 to the piston rod, the screw extending upwardly through a bushing in the bottom of basin 206 and carrying a a bumper 233 at its upper end. This bumper is constantly but gently pressed against the underside of the lower closure by the air pressure in cylinder 229. The action is therefore such that as lower closure 29 is raised, leaves 199 and 201 will also be swung upwardly. The arrangement is such that platen 197 will be lifted off lips 203 before leaves 199 and 201 begin their upward swinging movement. The upward lifting movement of the leaves will continue until crossbar 224 engages the underside of basin bottom 207, and at that point the lower closure will continue its upward movement. When the lower closure is retracted downwardly, it will engage bumper 233 at an intermediate point and the movement will be reversed, with leaves 199 and 201 swinging downwardly into the horizontal position before platen 197 is placed upon the lips.

Operation

Starting with lower closure 29 in its lower position and both platens 197 supported by table 196, the operator will place one or more articles on one of the platens and move the table until this platen is over the lower closure. At this time the other platen will be accessible for loading. Motor 204 will raise the lower closure while at the same time motor 229 lifts leaves 199 and 201. The lower closure will pick up the platen and continue through the recess in the table until it reaches its upper position, its teeth 114 passing between the teeth 123 of engagement ring 116. After the lower closure reaches its upper position, motor 125 will rotate engagement ring 116 until the two sets of teeth are in registry. Motors 101 will then rotate nuts 88 to draw clamp frame 93 upwardly, engagement ring 123 forcing the lower closure into engagement with seals 132 and 138. The seal integrity checking system will then operate as described in detail above. If the seals are tight, natural gas and oxygen will flow at controlled rates to both the thermal chamber and charging cylinders 37 and 38. At this time valves 33 and 34 will be open and vent valve 35 closed. Motor 39 will then operate the pistons of charging cylinders 37 and 38 to force the remaining combustible gas into the thermal chamber, and valves 33 and 34 will close. The pressure seal integrity checking system will again operate, and a measured amount of water will be injected into mixing block 32 by motor 192 to immerse the poppet members of the three valves in the mixing block.

Spark plug 183 will ignite the combustible gases, resulting in transient elevated gaseous temperatures in the thermal chamber which will remove burrs, sharp edges and other superfluous projections on the workpiece. The high pressure resulting from the explosion will act against the poppet valve members of valves 33, 34 and 35 to aid in their sealing action. The burned gases will be expelled from the thermal chamber through vent valve 35. Engagement ring 116 will then be rotated to its releasing position and allow motor 204 to lower the lower closure. At the same time bar 224 will be forced downwardly to swing leaves 199 and 201 into their lower position where they will receive the platen 197 deposited thereon as lower closure 29 continues to retract. Table 196 may then be swung to bring the new platen and its workpiece into position while the treated workpiece is removed and replaced by another one.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:
1. A thermal deburring unit comprising,
a thermal chamber having a downwardly open upper closure,
a vertically movable lower closure, means moving said lower closure between a lower position in which articles may be placed thereabove,
and an upper position in which said articles are within the upper closure,
pressure tight seal means between said closures when the lower closure is in its upper position, circumferentially arranged upwardly and downwardly facing surfaces on said upper and lower closures respectively, clamping means having a first portion engageable with the surface of said upper closure and a second portion engageable with the surface of said lower closure, tightening means movable between a sealing position in which said two clamping means portions are drawn together after said upper closure has been moved to its upper position, and a non-sealing position, means supplying pressurized combustible gases into said chamber after said tightening means has been moved to its sealing position, and means for igniting said pressurized gases.

2. A thermal deburring unit according to claim 1, said lower closure moving means comprising, a reciprocable fluid motor, and means supplying fluid to said motor at a predetermined and relatively low pressure, whereby an obstruction between said closures which prevents movement of the lower closure in its upper position will not cause damage to the closure surfaces.

3. A thermal deburring unit according to claim 1, said pressure tight seal means comprising, an annular groove in one of said closures and an uncompensated seal within said groove responsive to radially outward pressure to increase its sealing action.

4. A thermal deburring unit according to claim 3, said annular groove being formed in the bottom of said upper closure, a second groove outwardly of said first groove, a second uncompensated seal within said second groove, and seal integrity checking means comprising a conduit leading through said upper closure to the bottom thereof between said two grooves, a source of compressed air connected to said conduit, a pressure sensitive switch connected to said conduit, means for supplying gas at a predetermined pressure to said conduit from said source, means in said pressure sensitive switch for sensing whether said pressure is attained and then shutting off said source, means in said pressure sensitive switch for sensing whether the pressure is maintained after said shut-off, and control means for signalling continuation of the deburring operation only if said pressure is maintained.

5. A thermal deburring unit according to claim 4, further provided with means in said pressure sensitive switch for sensing a second pressure higher than said first pressure in the space between said seals when the combustible gas in said thermal chamber is charged into said thermal chamber, and control means responsive to the attainment of said higher pressure for initiating the remainder of the thermal deburring process.

6. A thermal deburring unit according to claim 1, the first portion of said clamping means comprising, a member surrounding said upper closure and engageable with its upwardly facing surface, said second portion of the clamping means comprising an engagement ring rotatably supported by said last-mentioned member and having circumferentially arranged inwardly extending teeth, the circumferentially arranged surface on said lower closure comprising teeth passable between said ring teeth as the lower closure is moved to its upper position, and means for rotating said ring after said lower closure has reached its upper position from a releasing position to an engaging position in which the ring teeth are in registry with the lower closure teeth.

7. A thermal deburring unit according to claim 6, said tightening means comprising a plurality of circumferentially arranged screw-and-nut assemblies connecting said clamping mean portions, and motor means for simultaneously driving said assemblies.

8. A thermal deburring unit according to claim 7, said clamping means member surrounding said upper closure comprising, a block supporting said screw-and-nut assemblies, said motor means comprising motors on said block connected to the nuts of said screw-and-nut assemblies, a clamp frame disposed between the screws of said screw-and-nut assemblies and said engagement ring, and a synchronizing gear connecting said nuts.

9. A thermal deburring unit according to claim 8, further provided with a retaining ring secured to the top of said upper closure and overlapping the inner portion of said block.

10. A thermal deburring unit according to claim 9, further provided with a sleeve surrounding the upper portion of said upper closure and extending between the top of said block and the underside of said retaining ring.

11. A thermal deburring unit comprising, an openable and closeable thermal chamber, means for placing articles in and removing them from said chamber, means for sealing the chamber pressure tight with an article therein, means for charging the sealed chamber with at least two gases forming a pressurized combustible mixture, a mixing block disposed between said charging means and said chamber, separate gas conduits leading from said charging means to said mixing block, a mixing chamber in said mixing block, a mixed gas conduit leading from said mixing chamber to said thermal chamber, valves interposed between said mixing chamber and the separate gas conduits leading from said charging means, said valves being poppet valves movable toward said mixing chamber to an open position and away from said mixing chamber to a closed position, whereby a pressure increase in said mixing chamber due to ignition of said gases in the thermal chamber will tend to further close said valves, and valve actuating means moving said valves to their open and closed positions.

12. A thermal deburring unit according to claim 11, said mixing block having an exhaust vent, an exhaust valve disposed between said mixed gases conduit and said exhaust vent, said exhaust valve being a poppet valve movable toward said mixed gases conduit to an open position and away from said mixed gases conduit to a closed position, whereby pressure in said mixed gases conduit will tend to further close said exhaust valve, and actuating means for moving said exhaust valve to its open and closed positions.

13. A thermal deburring unit according to claim 11, further provided with a source of water, and means for injecting a predetermined amount of water into the passages entering and connecting said mixing chamber and valves, said passages being so positioned that the water injected therein will rise to a level above and immerse the valves, so that the valves will be protected from thermal damage upon ignition of the gases in said thermal chamber.

14. A thermal deburring unit according to claim 13, said mixed gas conduit extending upwardly from said mixing chamber toward the upper portion of said mixing block and from there downwardly toward said thermal chamber, the level of said water injecting means and the predetermined amount of water being such that the water level will be below said upper end of the mixed gases conduit.

15. A thermal deburring unit according to claim 11, each of said valves comprising a valve stem, a bushing, said stem being slidably mounted in said bushing, said bushing being mounted in said block, a valve seat carried by the inner end of said bushing, enlarged portions on said bushing outwardly of said block, and a plurality of screws securing said enlarged bushing portions to said block.

16. A thermal deburring unit comprising, a sealable thermal chamber having a downwardly open upper closure, a vertically movable lower closure, a reciprocable motor beneath said lower closure, means connecting said lower closure to said motor, the lower closure being movable by said motor between an upper position against said upper closure and a lower position, work transport means movable above the lower position of said lower closure, and a plurality of spaced work supporting means carried by said work transport means, each work supporting means being movable between a work supporting position and a retracted position out of the path of movement of said lower closure, said work transport means being movable so that said work supporting means are successively placed above said lower closure when in its lower position.

17. A thermal deburring unit according to claim 16, said work transport means comprising a table having a plurality of openings, said work supporting means each comprising a pair of leaves hinged to said table, each pair of leaves being mounted in one of said openings and hinged so as to swing between a lower position in the plane of said table so as to partially close its opening and an upper position swung away from said opening.

18. A thermal deburring unit according to claim 17, further provided with a work bearing platen resting on each pair of leaves when in their lower position, said platens being substantially smaller than said lower closure, the table being movable so that platens are alternately placed above said lower closure when in its lower position, whereby said lower closure will lift said platen when the lower closure is moved toward its upper position.

19. A thermal deburring unit according to claim 18, said lower closure and platens being circular, said leaves having arcuate, inwardly facing lips supporting said platens when the leaves are in their lower position, said means for swinging said leaves comprising a plurality of vertically movable rods, means constantly urging said leaf swinging means upwardly against said lower closure, whereby the rods will follow the upward movement of said lower closure by said motor, and means limiting the upward movement of said rods.

20. A thermal deburring unit according to claim 17, further provided with means responsive to upward movement of said closure from its lower position for swinging said leaves to their upper positions, whereby said lower closure may pass through said opening.

21. A thermal deburring unit according to claim 16, said lower closure being further provided with water cooling passages, and a water supply tube connected to said lower closure, said tube being vertically movable with the lower closure.

22. A thermal deburring unit according to claim 21, said lower closure comprising a main portion and an insert secured to the top of said main portion, said insert having a smaller diameter than said main portion, the main portion having an upwardly facing sealing surface extending outwardly of the said insert, a passage leading from said water tube to said last-mentioned surface, and means for conducting air to said water tube, whereby said surface may be cleaned by water and air before the lower closure is raised.

* * * * *